United States Patent [19]

Yamamoto et al.

[11] Patent Number: 5,238,974

[45] Date of Patent: * Aug. 24, 1993

[54] PLASTIC CLADDING COMPOSITION FOR SILICA OR GLASS CORE OPTICAL FIBER, AND SILICA OR GLASS CORE OPTICAL FIBER PREPARED THEREFROM

[75] Inventors: Takashi Yamamoto, Hiroshima; Tsuruyoshi Matsumoto; Katsuhiko Shimada, both of Ootake; Ryuji Murata, Iwakuni, all of Japan

[73] Assignee: Mitsubishi Rayon Company Ltd., Tokyo, Japan

[*] Notice: The portion of the term of this patent subsequent to Jun. 11, 2008 has been disclaimed.

[21] Appl. No.: 613,972

[22] Filed: Nov. 15, 1990

Related U.S. Application Data

[63] Continuation of Ser. No. 81,759, Aug. 5, 1987, abandoned.

[30] Foreign Application Priority Data

| | | |
|---|---|---|
| Aug. 6, 1986 [JP] | Japan | 61-183342 |
| Feb. 26, 1987 [JP] | Japan | 62-41379 |
| Feb. 26, 1987 [JP] | Japan | 62-41380 |
| Apr. 3, 1987 [JP] | Japan | 62-82704 |

[51] Int. Cl.$^5$ .................... G02B 6/02; C08F 2/50; C08F 18/20; C08F 220/24
[52] U.S. Cl. .................... 522/075; 522/182; 526/245; 523/300; 385/123
[58] Field of Search ........... 522/182, 179, 180, 75; 526/245; 350/96.29; 523/300

[56] References Cited

U.S. PATENT DOCUMENTS

| | | | |
|---|---|---|---|
| 3,993,834 | 11/1976 | Chimura et al. | 428/373 |
| 4,511,209 | 4/1985 | Skutnik | 350/96.34 |
| 4,566,755 | 1/1986 | Ohmori et al. | 526/245 |
| 4,707,076 | 11/1987 | Skutnik et al. | 350/96.34 |
| 4,720,166 | 1/1988 | Ohmori et al. | 526/245 |
| 5,022,737 | 6/1991 | Yamamoto et al. | 350/96.29 |
| 5,149,753 | 9/1992 | Inukai et al. | 526/245 |
| 5,153,288 | 10/1992 | Matsunaga et al. | 526/245 |

FOREIGN PATENT DOCUMENTS

| | | |
|---|---|---|
| 0128516 | 6/1984 | European Pat. Off. . |
| 2252586 | 11/1974 | France . |
| 147010 | 8/1984 | Japan . |
| 0090855 | 5/1985 | Japan . |

*Primary Examiner*—Susan Berman
*Attorney, Agent, or Firm*—Finnegan, Henderson, Farabow, Garrett & Dunner

[57] ABSTRACT

Disclosed is a cladding composition suitable for a plastic clad silica or glass core optical fiber of a good light transmittance. The cladding composition comprises (A) a fluorinated monofunctional acrylate or α-fluoroacrylate composition, (B) a polyfunctional acrylate or α-fluoroacrylate having at least two acryloyl or α-fluoroacryloyl radicals in the molecule, (C) a photoinitiator, and if desired, (D) a stabilizer selected from thiodicarboxylic acid diesters and hindered phenols. The fluorinated monofunctional acrylate or α-fluoroacrylate comprises 1–60 weight % of a highly fluorinated acrylate or α-fluoroacrylate of the formula:

$$CH_2=\overset{Y}{\underset{|}{C}}-COO(CH_2)_l(CF_2)_nX \qquad (I)$$

wherein Y is H or F, X is H or F, l is 1 to 12 and n is 5 to 12, and 40–99 weight % of a lowly fluorinated acrylate or α-fluoroacrylate of the formula:

$$CH_2=\overset{Y}{\underset{|}{C}}-COOCH_2(CF_2)_mX \qquad (II)$$

wherein X and Y are as defined above, and m is 1 to 3.

10 Claims, No Drawings

PLASTIC CLADDING COMPOSITION FOR SILICA OR GLASS CORE OPTICAL FIBER, AND SILICA OR GLASS CORE OPTICAL FIBER PREPARED THEREFROM

This application is a continuation of application Ser. No. 07/081,759, filed Aug. 5, 1987 now abandoned.

BACKGROUND OF THE INVENTION

(1) Field of the Invention

The present invention relates to a plastic cladding composition for a silica or glass core optical fiber, and further, to a silica or glass core optical fiber prepared from this cladding composition.

(2) Description of the Related Art

A quartz glass core optical fiber has been used in the field of long-distance communication, and means for utilizing this quartz glass core optical fiber in other fields, for example, the field of short-to-medium distance communication, is now being examined.

The quartz glass core has an excellent heat resistance over a plastic core. However, the quartz glass core optical fiber has a problem in that it is difficult to impart light transmitting characteristics to the quartz glass core optical fiber and the product is therefore expensive, and since the toughness is low, the quartz glass core optical fiber is readily broken. Means for improving the toughness of the quartz glass core optical fiber has been examined. For example, Japanese Unexamined Patent Publication No. 58-223638 proposes a quartz fiber having a protecting layer formed of a radiation-curable coating composition. This method for preparing a quartz glass core optical fiber is simpler than the heretofore developed methods, and the obtained optical fiber has an improved toughness. However, since the quartz glass optical fiber exerting a function of showing the light transmission capacity is formed by the conventional process, the product is very expensive. Accordingly, development of a method for preparing at a low manufacturing cost a quartz glass optical fiber usable as an optical fiber for medium-distance communication or short-distance communication is eagerly desired.

U.S. Pat. No. 4,511,209 discloses a cladding composition for plastic clad silica core optical fibers, which comprises a highly fluorinated monofunctional acrylate, a polyfunctional acrylate being trifunctional or higher serving as a crosslinking agent, a monofunctional or trifunctional thiol functioning as a synergist, and a photoinitiator. In order to maintain a good pliability in the formed polymer cladding, the highly fluorinated monofunctional acrylate of the cladding composition has an alkyl radical substituted with at least 12 fluorine atoms, and a specific thiol compound such as γ-mercaptopropyltrimethoxysilane is used as the synergist.

According to this known technique, a plastic clad silica core optical fiber can be prepared by simplified steps. However, the compatibility of the cladding composition with the crosslinkable polyfunctional acrylate is poor and, therefore, the plastic cladding often becomes turbid and it is difficult to obtain a plastic clad silica core optical fiber having excellent light transmission characteristics.

SUMMARY OF THE INVENTION

It is a primary object of the present invention to provide a core-clad type silica fiber having excellent light transmission characteristics, which comprises a fused silica core and an ultraviolet ray-cured cladding composition.

Another object of the present invention is to provide an ultraviolet-ray cured cladding composition in which the content of a highly fluorinated monofunctional acrylate or α-fluoroacrylate, which is expensive, is reduced and the compatibility with a crosslinkable polyfunctional acrylate is improved to impart a high transparency.

In accordance with the present invention, there is provided a cladding composition for a plastic clad silica or glass core optical fiber having a silica or glass core with a refractive index $n_1$, which comprises (A) a fluorinated monofunctional acrylate or α-fluoroacrylate composition comprising a highly fluorinated monofunctional acrylate or α-fluoroacrylate represented by the following formula (I):

wherein Y represents H or F, X represents H or F, l is an integer of from 1 to 12 and n is an integer of from 5 to 12, preferably 7 to 10, and a lowly fluorinated monofunctional acrylate or α-fluoroacrylate represented by the following formula (II):

wherein X and Y are as defined above, and m is an integer of from 1 to 3, preferably 1 or 2, at a weight ratio of from 1/99 to 60/40, (B) a polyfunctional acrylate or α-fluoroacrylate having at least two acryloyl or α-fluoroacryloyl radicals in the molecule, (C) a photoinitiator, and if necessary, (D) at least one stabilizer selected from the group consisting of thiodicarboxylic acid diesters and hindered phenols, the refractive index $n_2$ of a cured product of said cladding composition satisfying a requirement of $(n_1 - n_2) \geq 0.01$.

In accordance with another aspect of the present invention, there is provided a plastic clad silica or glass core optical fiber comprising a silica or glass core with a refractive index $n_1$ and an ultraviolet ray-cured cladding composition with a refractive index $n_2$, wherein the cladding composition comprises (A) a fluorinated monofunctional acrylate or α-fluoroacrylate composition comprising a highly fluorinated monofunctional acrylate or α-fluoroacrylate represented by the following formula (I):

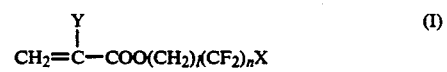

wherein Y represents H or F, X represents H or F, l is an integer of from 1 to 12 and n is an integer of from 5 to 12, and a lowly fluorinated monofunctional acrylate or α-fluoroacrylate represented by the following formula (II):

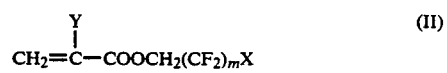

wherein X and Y are as defined above, and m is an integer of from 1 to 3, at a weight ratio of from 1/99 to 60/40, (B) a polyfunctional acrylate or α-fluoroacrylate having at least two acryloyl or α-fluoroacryloyl radicals in the molecule, (C) a photoinitiator, and if necessary, (D) at least one stabilizer selected from the group consisting of thiodicarboxylic acid diesters and hindered phenols, the refractive index $n_2$ of a cured product of said cladding composition satisfying a requirement of $(n_1-n_2) \geq 0.01$.

DESCRIPTION OF THE PREFERRED EMBODIMENTS

As the highly fluorinated monofunctional acrylate or α-fluoroacrylate of the formula (I) used in carrying out the present invention, there can be mentioned acrylates and α-fluoroacrylates having a fluoroalkyl radical selected from 1,1,2,2-tetrahydroperfluorododecyl, 1,1,2,2-tetrahydroperfluorodecyl, trihydroperfluoroheptyl, trihydroperfluoroundecyl, perfluorodecyl, —$C_8F_{17}$, —$C_{10}F_{21}$ and —$C_{12}F_{25}$ radicals.

As the lowly fluorinated monofunctional acrylate represented by the formula (II), there can be mentioned acrylates and α-fluoroacrylates having a fluoroalkyl radical selected from 2,2,3,3-tetrafluoropropyl, trifluoroethyl, 2,2,3,3,3-pentafluoropropyl, 1-trifluoromethyl-2,2,2-trifluoroethyl, 1-trifluoromethyl-1,2,2,2-tetrafluoroethyl, 2,2,3,4,4,4-hexafluorobutyl, 1-methyl-2,2,3,4,4,4-hexafluorobutyl, 1,1-dimethyl-2,2,3,3-tetrafluoropropyl and 1,1-dimethyl-2,2,3,4,4,4-hexafluorobutyl radicals.

Since the cladding composition of the present invention comprises the fluorine-containing monomers represented by the general formulae (I) and (II) in combination, the cladding composition is valuable for forming a plastic clad silica core optical fiber which has a high pliability, a high toughness, a high heat resistance, and a highly improved compatibility with the polyfunctional acrylate or α-fluoroacrylate.

For preparing a plastic clad silica core optical fiber capable of attaining the objects of the present invention, a fluorinated monofunctional acrylate or α-fluoroacrylate composition comprising the highly fluorinated monofunctional acrylate or α-fluoroacrylate of the formula (I) and the lowly fluorinated monofunctional acrylate or α-fluoroacrylate of the formula (II) at a weight ratio of from 1/99 to 60/40, preferably from 5/95 to 50/50, is incorporated in the cladding composition preferably in an amount of 50 to 98% by weight. Namely, the cladding polymer prepared from a cladding composition comprising a fluoromonofunctional acrylate or α-fluoroacrylate mixture in which the ratio of the acrylate or α-fluoroacrylate represented by the formula (I) to the acrylate or α-fluoroacrylate represented by the formula (II) is smaller than 1/99 is hard and has a poor softness, and the refractive index tends to increase. In addition, a plastic clad silica core optical fiber having a large numerical aperture is difficult to obtain. When a fluoro-monofunctional acrylate mixture in which the above-mentioned ratio is larger than 60/40 is used, the compatibility with the polyfunctional acrylate or α-fluoroacrylate and photoinitiator constituting the cladding composition of the present invention is degraded, and the formed cladding polymer is opaque and has a poor toughness.

Since the cladding composition of the present invention comprises 50 to 98% by weight of the monofunctional acrylate or α-fluoroacrylate mixture comprising the acrylate or α-fluoroacrylate of the formula (I) and the acrylate or α-fluoroacrylate of the formula (II) at a weight ratio of from 1/99 to 60/40, preferably from 5/95 to 50/50, the polymer cladding prepared from the cladding composition of the present invention has a high transparency, a high toughness and a high pliability in combination. The highly fluorinated acrylate or α-fluoroacrylate of the formula (I) as the cladding agent exhibits a poor compatibility with other cladding agents, and a cladding composition comprising this highly fluorinated acrylate or α-fluoroacrylate alone and a polymer cladding formed from this cladding composition tend to become opaque. Therefore, in this case, the ingredients of the cladding composition capable of providing a plastic clad silica core optical fiber are restricted. In contrast, since the cladding composition of the present invention comprises the lowly fluorinated monofunctional acrylate or α-fluoroacrylate of the formula (II) in addition to the highly fluorinated monofunctional acrylate or α-fluoroacrylate of the formula (I), the compatibility with other cladding agents is highly improved, and the polymer cladding prepared from this cladding composition is excellent in the transparency. Therefore, a polymer clad silica core optical fiber having an attenuation smaller than 10 dB/km and being capable of sufficiently transmitting light along 1 to 2 km can be easily obtained.

In order to improve the heat resistance and chemical resistance of the plastic clad plastic core optical fiber of the present invention, a polyfunctional acrylate or α-fluoroacrylate having at least two acryloyl or α-fluoroacryloyl radicals in the molecule is incorporated in the cladding composition. As the polyfunctional acrylate or α-fluoroacrylate, preferably a polyfunctional acrylate or α-fluoroacrylate represented by the following formula (V):

wherein X represents H or F, A represents for a group formed by removing at least 2 hydroxyl groups from a polyol compound, and p is an integer of at least 2, is incorporated in an amount of 1 to 20% by weight by into the cladding composition.

As specific examples of the group A in the formula (V), the following groups can be mentioned:

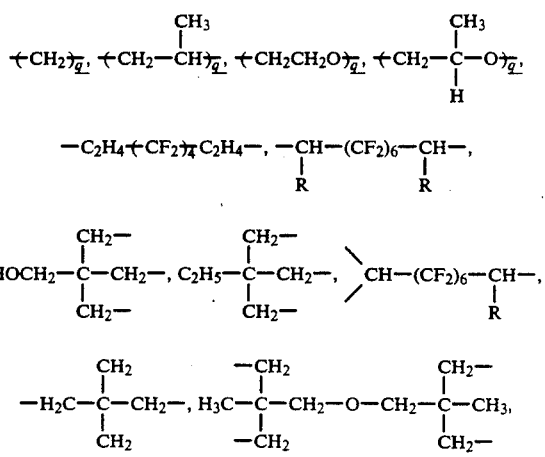

-continued

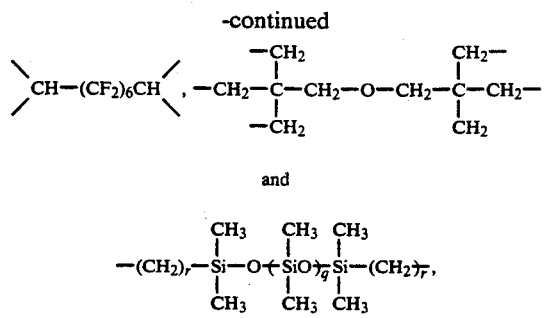

and

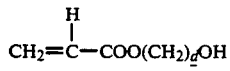

wherein q is an integer of 1 to 1000 and r is an integer of 3 to 10.

Preferably, the polyfunctional acrylate or α-fluoroacrylate is contained in an amount of 1 to 20% by weight in the cladding composition of the present invention. The compatibility of the polyfunctional acrylate or α-fluoroacrylate with other components of the cladding composition is not so good. Accordingly, a cladding composition containing a large amount of the polyfunctional acrylate or α-fluoroacrylate has a poor transparency. Since the cladding composition of the present invention contains the polyfunctional acrylate or α-fluoroacrylate in an amount of 1 to 20% by weight, the cladding composition exhibits an excellent transparency, and the plastic cladding formed from this cladding composition has excellent heat resistance, moisture resistance and stress resistance. Accordingly, a plastic clad silica or glass core optical fiber provided with this polymer cladding has excellent characteristics.

In order to improve the adhesion of the polymer cladding to the silica or glass core, preferably, a chemical compound represented by the following formula:

$$CH_2=\overset{H}{\underset{|}{C}}-COO(CH_2)_d OH$$

wherein d is an integer of from 1 to 8, or

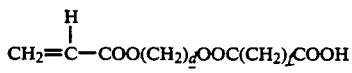

wherein d and f are integers of from 1 to 8, is incorporated in an amount of 0.5 to 10% by weight in the cladding composition of the present invention.

As specific examples of the photoinitiator to be incorporated in the cladding composition of the present invention, there can be mentioned benzoin, benzoin alkyl ethers, 2-methylbenzoin, benzophenone, Michler's ketone, benzyl, benzyldimethylketal, anthraquinone, methylanthraquinone, diacetyl, acetophenone, diphenyl sulfide and anthracene. It is preferably the photoinitiator is incorporated in the cladding composition in an amount of 0.1 to 10% by weight.

Furthermore, in order to improve the heat resistance and light resistance of the polymer cladding, preferably a thiodicarboxylic acid ester or hindered phenol is incorporated as a stabilizer in an amount of 0.01 to 5% by weight into the cladding composition of the present invention.

For example, there can be mentioned hindered phenols such as 2,6-di-t-butyl-4-methylphenol, 2,2'-methylenebis(4-methyl-6-t-butylphenol), 4,4'-thiobis(6-t-butyl-3-methylphenol), 4,4'-butylidene-bis(3-methyl-6-t-butylphenol), 1,3,5-trimethyl-2,4,6-tris(3,5-di-t-butyl-4-hydroxybenzyl)benzene, 1,3,5-tris(2-methyl-4-hydroxy-5-t-butylphenol)butane, octadecyl-3-(3,5-di-t-butyl-4-hydroxyphenyl)propionate, triethylene glycol-bis[3-(3-t-butyl-5-methyl-4-hydroxyphenyl)propionate] and 1,6-hexanediol-bis[3-(3,5-di-t-butyl-4-hydroxyphenyl)propionate], and thiodicarboxylic acid esters such as dilauryl thiodipropionate and distearyl thiodipropionate. These thiodicarboxylic acid esters and hindered phenols may be used either alone or in combination.

The plastic clad silica or glass core optical fiber of the present invention has enhanced heat resistance, bending resistance, stress resistance and light resistance as compared with the conventional optical fibers of the same type. Furthermore, since the cladding composition of the present invention can be cured in a short time under irradiation with ultraviolet rays, a plastic clad silica or glass core optical fiber can be prepared at a higher production rate than in the conventional techniques.

The present invention will now be described in detail with reference to the following examples.

EXAMPLE 1

A cladding composition of Run No. 1 shown in Table 1 was flow-coated to a thickness of 100 μm on a glass sheet and the film was irradiated with ultraviolet rays by a high-pressure mercury lamp having an output of 80 W/cm for 1 second in an inert atmosphere to obtain a crosslinked cured film. The physical properties of the cured film are shown in Table 1.

A fiber core formed of quartz, which had an outer diameter of 200 μm, was spun at a drawing speed of 60 m/min. Then, the cladding composition of Run No. 1 shown in Table 1 was coated on the surface of the fiber core and the coated fiber was irradiated with ultraviolet rays by a high-pressure mercury lamp having an output of 80 W/cm to form a plastic clad silica core optical fiber having a cladding thickness of 5 μm. The attenuation of the optical fiber was small and 7.5 dB/km at 850 nm. When the optical fiber was heat-treated at 130° C. for 300 hours, the light transmittance was changed only to a negligible extent.

EXAMPLES 2 THROUGH 6

Cured films were prepared by using cladding compositions shown in Table 1 in the same manner as described in Example 1. The refractive indexes of the cured films are shown in Table 1. Each cured film was transparent and pliable.

In the same manner as described in Example 1, cladding compositions were coated on the surfaces of quartz fibers, and when the light transmittance and heat resistance of each of the so-obtained plastic clad silica core optical fibers were evaluated, it was found that the light transmittance of each fiber was as good as that of the optical fiber obtained in Example 1 and the heat resistance was excellent.

TABLE 1

| Example No. | Cladding composition | (weight %) | Transparency of composition | Transparency of cured product | Refractive index of cured product | Attenuation at 850 nm (dB/km) Start | After treatment at 130° C. for 300 hours |
|---|---|---|---|---|---|---|---|
| | $CH_2=CHCOOCH_2C_2F_5$ | 66 | Transparent | Transparent | 1.388 | 7.5 | 8.2 |
| | $CH_2=CHCOO(CH_2)_2C_8F_{17}$ | 26 | | | | | |
| | $CH_2=CHCOO(CH_2)_4OCOCH=CH_2$ | 5 | | | | | |
| | Benzyldimethylketal | 3 | | | | | |
| | $CH_2=CHCOOCH_2CF_3$ | 70 | Transparent | Transparent | 1.414 | 8.2 | 9.1 |
| | $CH_2=CHCOO(CH_2)_2C_6F_{13}$ | 4.5 | | | | | |
| | $CH_2=CHCOO(CH_2)_2C_8F_{17}$ | 6 | | | | | |
| | $CH_2=CHCOO(CH_2)_2C_{10}F_{21}$ | 4.5 | | | | | |
| | $CH_2=CHCOO(CH_2CH_2O)_4COCH=CH_2$ | 10 | | | | | |
| | Benzyldimethylketal | 5 | | | | | |
| | $CH_2=CHCOOCH_2(CF_2)_2H$ | 31 | Transparent | Transparent | 1.415 | 6.8 | 7.7 |
| | $CH_2=CHCOOCH_2CF_3$ | 53 | | | | | |
| | $CH_2=CHCOO(CH_2)_2C_8F_{17}$ | 9 | | | | | |
| | $(CH_2=CHCOOCH_2)_3CCH_2CH_3$ | 5 | | | | | |
| | 1-Hydroxycyclohexyl phenyl ketone | 2 | | | | | |
| | $CH_2=CHCOOCH_2CF_3$ | 73 | Transparent | Transparent | 1.421 | 8.8 | 9.5 |
| | $CH_2=CHCOO(CH_2)_2C_8F_{17}$ | 10 | | | | | |
| | $CH_2=CHCOOCH_2CH_2OH$ | 8 | | | | | |
| | $+CH_2=CHCOOCH_2\overline{)_4}C$ | 7 | | | | | |
| | 1-Hydroxycyclohexyl phenyl ketone | 2 | | | | | |
| | $CH_2=CFCOOCH_2C_2F_5$ | 78 | Transparent | Transparent | 1.388 | 6.6 | 7.5 |
| | $CH_2=CHCOO(CH_2)_2C_8F_{17}$ | 5 | | | | | |
| | $CH_2=CHCOO(CH_2)_6OCOCH=CH_2$ | 14 | | | | | |
| | 1-Hydroxycyclohexyl phenyl ketone | 3 | | | | | |
| | $CH_2=CFCOOCH_2CF_3$ | 82 | Transparent | Transparent | 1.397 | 8.1 | 8.9 |
| | $CH_2=CFCOOCH_3$ | 4 | | | | | |
| | $CH_2=CFCOO(CH_2)_2C_8F_{17}$ | 5 | | | | | |
| | $CH_2=CHCOOCH_2\underset{\underset{CH_3}{\mid}}{\overset{\overset{CH_3}{\mid}}{C}}CH_2OCOCH=CH_2$ | 7 | | | | | |
| | 1-Hydroxycyclohexyl phenyl ketone | 2 | | | | | |

COMPARATIVE EXAMPLES 1 THROUGH 3

The procedures of Example 1 were repeated in the same manner by using cladding compositions shown in Table 2. Each of these compositions was opaque and the cured product was turbid.

Optical fibers were prepared in the same manner as described in Example 1 by coating these light-curable cladding compositions on quartz fibers. The light transmittance of each optical fiber was poor and the attenuation exceeded 100 dB/km at 850 nm.

parent, did not discolor and kept pliable even after heat-treatment at 150° C. for 300 hours.

Separately, in the same manner as described in Example 1, a quartz fiber was coated with the above-mentioned stabilizer-incorporated cladding composition to obtain a plastic clad silica core optical fiber. The light transmittance and heat resistance were evaluated. The obtained results are shown in Table 3. It can be seen from these results that the attenuation was small and the heat resistance was improved.

TABLE 2

| Comparative Example No. | Cladding composition | (weight %) | Transparency of composition | Transparency of cured product | Refractive index of cured product | Attenuation at 850 nm (dB/km) |
|---|---|---|---|---|---|---|
| 1 | $CH_2=CHCOO(CH_2)_2C_{10}F_{21}$ | 88 | Opaque | Turbid | *1 | >100 |
| | $(CH_2=CHCOOCH_2)_3CCH_2CH_3$ | 10 | | | | |
| | Benzyldimethylketal | 2 | | | | |
| 2 | $CH_2=CHCOOCH_2CF_3$ | 28 | Opaque | Turbid | *1 | >100 |
| | $CH_2=CHCOO(CH_2)_2C_{10}F_{21}$ | 60 | | | | |
| | $(CH_2=CHCOOCH_2)_4C$ | 8 | | | | |
| | Benzyldimethylketal | 4 | | | | |
| 3 | $CH_2=CHCOO(CH_2)_2C_8F_{17}$ | 76 | Opaque | Turbid | *1 | >100 |
| | $CH_2=CHCOOCH_2CH_2OH$ | 5 | | | | |
| | $(CH_2=CHCOOCH_2)_3CCH_2CH_3$ | 14 | | | | |
| | Benzyldimethylketal | 5 | | | | |

*1 Refractive index was not measured because the cured compositions were turbid

EXAMPLES 7 THROUGH 12

A cured film was prepared in the same manner as described in Example 1 except that a stabilizer shown in Table 3 was added to the light-curable composition of Example 1 shown in Table 1. Each cured film was trans-

TABLE 3

| Example No. | Stabilizer | (weight parts)* | Attenuation at 820 nm (dB/km) Start | Attenuation at 820 nm (dB/km) After treatment at 150° C. for 300 hours |
| --- | --- | --- | --- | --- |
| 7 | 4,4'-Thiobis(3-methyl-6-t-butylphenol) | 0.5 | 7.5 | 9.5 |
| 8 | 3,6-Di-t-butyl-4-methyl-phenyl | 0.5 | 7.5 | 9.8 |
| 9 | 1,6-Hexanediol-bis[3-(3,5-di-t-butyl-hydroxyphenyl)propionate] | 0.5 | 7.8 | 9.2 |
| 10 | 2,2'-Methylenebis(4-methyl-6-t-butylphenol) Dilauryl thiodipropionate | 0.25 0.5 | 8.0 | 8.8 |
| 11 | Triethylene glycol-bis-3-(3-t-butyl-4-hydroxy-5-methylphenyl)propionate Dilauryl thiodipropionate | 0.25 0.5 | 8.0 | 8.6 |
| 12 | Octadecyl-3-(3,5-di-t-butyl-4-hydroxyphenyl) propionate Dilauryl thiodipropionate | 0.5 0.25 | 7.9 | 9.0 |

*Weight parts per 100 weight parts of the light-curable composition of Example 1

We claim:

1. An ultraviolet ray-curable cladding composition for a plastic clad silica or glass core optical fiber, which consists essentially of (A) a fluorinated monofunctional acrylate or α-fluoroacrylate composition consisting essentially of a highly fluorinated monofunctional acrylate or α-fluoroacrylate represented by the following formula (I):

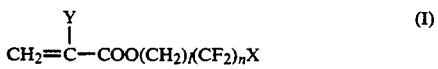
$$CH_2=\underset{\underset{Y}{|}}{C}-COO(CH_2)_l(CF_2)_nX \quad \text{(I)}$$

wherein Y represents H or F, X represents H or F, l is an integer of from 1 to 12 and n is an integer of from 5 to 12, and a lowly fluorinated monofunctional acrylate or α-fluoroacrylate represented by the following formula (II):

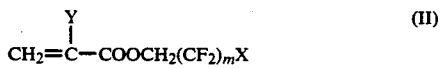
$$CH_2=\underset{\underset{Y}{|}}{C}-COOCH_2(CF_2)_mX \quad \text{(II)}$$

wherein X and Y are as defined above, and m is an integer of from 1 to 3, at a compound (I)/compound (II) weight ratio of from 2/98 to 60/40, (B) polyfunctional acrylate or α-fluoroacrylate having at least two acryloyl or α-fluoroacryloyl radicals in the molecule and (C) a photoinitiator, the refractive index of the cured product of said cladding composition satisfying $(n_1-n_2)>0.01$, wherein $n_1$ and $n_2$ are the refractive indices of said core optical fiber and said cured cladding composition, respectively.

2. A cladding composition as set forth in claim 1, which comprises 50 to 98% by weight of the fluorinated monofunctional acrylate or α-fluoroacrylate composition, 1 to 20% by weight of the polyfunctional acrylate or α-fluoroacrylate (B) and 0.1 to 10% by weight of the photoinitiator (C).

3. A cladding composition as set forth in claim 1 or 2, wherein the fluorinated monofunctional acrylate or α-fluoroacrylate composition comprises a highly fluorinated monofunctional acrylate or α-fluoroacrylate of the formula (I) in which n is an integer of from 7 to 10 and a lowly fluorinated monofunctional acrylate or 6-fluoroacryalte of the formula (II) in which m is 1 or 2.

4. A cladding composition as set forth in claim 1 which further contains at least one stabilizer selected from the group consisting of thiodicarboxylic acid diesters and hindered phenols.

5. A cladding composition as set forth in claim 4, wherein the stabilizer is dilauryl thiodipropionate.

6. A cladding composition as set forth in claim 1, wherein the fluorinated monofunctional acrylate or α-fluoroacrylate composition comprises a highly fluorinated monofunctional acrylate or α-fluoroacrylate of the formula (I) in which n is an integer of from 7 to 10 and X is F, and a lowly fluorinated monofunctional acrylate or α-fluoroacrylate of the formula (II) in which m is 1 or 2 and X is F.

7. A cladding composition as set forth in claim 1, wherein the polyfunctional acrylate is an alkylene glycol diacrylate.

8. A cladding composition as set forth in claim 7, wherein the alkylene glycol diacrylate is hexaethylene glycol diacrylate.

9. An ultraviolet ray-curable cladding composition as set forth in claim 1 having a compound (I)/compound (II) ratio of 5/95 to 50/50.

10. An ultraviolet ray-curable cladding composition as set forth in claim 1 wherein in formula (I) n is 8 and in formula (II) m is 2.

* * * * *

UNITED STATES PATENT AND TRADEMARK OFFICE
CERTIFICATE OF CORRECTION

PATENT NO. : 5,238,974
DATED : August 24, 1993
INVENTOR(S) : YAMAMOTO et al.

It is certified that error appears in the above-identified patent and that said Letters Patent is hereby corrected as shown below:

In the ABSTRACT, the formula (I) should read as follows:

In the ABSTRACT, line 14, after "F," the first numeral "1" should read --$l$--.

Column 9, line 39, the formula (I) should read:

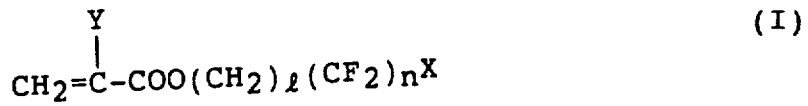

Column 9, line 41, after "F," the first numeral "1" should read --$l$--.

UNITED STATES PATENT AND TRADEMARK OFFICE
CERTIFICATE OF CORRECTION

PATENT NO. : 5,238,974
DATED : August 24, 1993
INVENTOR(S) : Yamamoto et al.

It is certified that error appears in the above-indentified patent and that said Letters Patent is hereby corrected as shown below:

Column 10, lines 22-23, "6-fluoroacryalte" should read --$\alpha$- fluoroacrylate--.

Signed and Sealed this

Third Day of May, 1994

BRUCE LEHMAN

*Attest:*

*Attesting Officer*   Commissioner of Patents and Trademarks